United States Patent [19]

Doto

[11] Patent Number: 4,585,279
[45] Date of Patent: Apr. 29, 1986

[54] LOAD RESPONSIVE BRAKE CONTROL VALVE

[75] Inventor: Shigeaki Doto, Kobe, Japan
[73] Assignee: Nippon Air Brake Co., Ltd., Kobe, Japan
[21] Appl. No.: 631,673
[22] Filed: Jul. 17, 1984
[30] Foreign Application Priority Data

Jul. 20, 1983 [JP] Japan .................. 58-113628[U]

[51] Int. Cl.[4] .............................................. B60T 8/18
[52] U.S. Cl. ................................ 303/22 R; 188/195; 303/68; 303/15
[58] Field of Search ............... 303/22 R, 22 A, 28-30, 303/40, 15, 3, 20, 68; 188/195; 137/627.5

[56] References Cited

U.S. PATENT DOCUMENTS

| | | | |
|---|---|---|---|
| 3,425,752 | 2/1969 | Pöllinger et al. | 303/22 A X |
| 3,944,287 | 3/1976 | Nagase | 303/22 R X |
| 4,073,541 | 2/1978 | Nagase | 303/22 R X |
| 4,239,292 | 12/1980 | Nagase | 303/22 R X |

Primary Examiner—Douglas C. Butler
Attorney, Agent, or Firm—G. J. Falce

[57] ABSTRACT

A load responsive valve for the braking of vehicles having load supporting air springs. The air spring pressure is employed to regulate the brake pressure through conventional proportioning-type valving. A pilot valve senses the application and release of the vehicle brakes in order to nullify operation of the air spring operated control piston so long as the brake is released, in order to reduce component wear and air consumption due to valve oscillation resulting from air spring pressure variation as the car jounces in service. This is accomplished by pilot pressure supplied via the pilot valve to counteract the air spring pressure acting on the control piston. During a brake application, the pilot valve exhausts this pilot pressure to permit the air spring pressure to operate the control valve in a normal manner.

10 Claims, 5 Drawing Figures

LOAD RESPONSIVE BRAKE CONTROL VALVE

BACKGROUND OF THE INVENTION

This invention concerns a load responsive valve for rolling stock which operates the brake control automatically according to the load on the rolling stock.

Brake control is very important in operating rolling stock, especially with automatic train operation (ATO) and automatic train control (ATC). A brake which can automatically respond to the rolling stock load is essential. For example, in the case of railroad rolling stock which has (an) air spring car(s), a load responsive valve has been designed and has been used as follows. Using air spring pressure which changes in proportion to the rolling stock load, the air spring pressure (control pressure) and the brake output pressure correspond to each other, since the brake output pressure is determined by the air spring pressure. The following is a description of a conventional load responsive valve based on FIG. 1. Control pressure responding to the rolling stock load was set as (the) air spring pressure, and air was used as the pressurized medium.

An input chamber 6 is formed between the top of the main body 1 and the upper wall 2. The supply valve seat 11 provided on the upper wall 2 has a supply valve 13, and a supply spring 14 attached to the supply valve. A hollow-cylindrical discharge valve 15 can slide up and down through the detached wall 3 without leaking any pressure through the wall. Below the detached wall 3, around the discharge valve 15, a plate-type balance piston 4 is installed. The discharge valve 15 forms a discharge valve seat 16 at its upper end. It is positioned inside the supply valve seat 11 and faces the supply valve 13. The inner hole 17 of the discharge valve 15 opens at the lower end to the discharge chamber 9 which is described later. In the detached wall 3, there is a connecting hole 12 which connects the output chamber 7 formed between the detached wall 3 and the upper wall 2, and the balance chamber 8 formed between the detached wall 3 and the balance piston 4. Below the balance piston 4 above the plate-type control piston 5, there is a discharge chamber 9 placed with a control spring 18. The control chamber 10 is formed at the bottom of the body 1 below the control piston 5. The input chamber 6 is connected to the pressurized air source (not shown) through the input pipe 19. The output chamber 7 is connected to the relay valve 26 of the brake control system (not shown) through the output pipe 20. The discharge chamber 9 is connected to the atmosphere through the discharge port 21. The control chamber 10 is connected to the air spring (not shown) by the brake air reservoir 23 and the throttle 24 through the control pipe 22, 25.

When the brake is released and the rolling stock is running, pressurized air from the pressurized air source flows into the input chamber 6 through the input pipe 19. The pressurized air of the air spring flows into the control chamber 10 through the control pipe 25, the throttle 24, the braking air reservoir 23, and the control pipe 22. Therefore, the control piston 5 moves upward. The balance piston 4 and the discharge valve 15 are pushed upward by the control spring 18. The discharge valve seat 16 of the discharge valve 15 comes into contact with the bottom of the supply valve 13 and closes the open area. The discharge valve 15 moves up even higher and the supply valve is moved away from the supply valve seat 11. As a result, the pressurized air in the input chamber 6 goes through the supply valve seat 11, flows into the output chamber 7, and is supplied to the relay valve 26 of the brake control system through the output pipe 20. On the other hand, pressurized air in the output chamber 7 flows into the balance chamber 8 through the connecting hole 12 of the detached wall 3, and is effective to push down the balance piston 4. Thus, the upward force which actuates the control piston 5 and the downward force which actuates the balance piston 4 oppose each other by means of the control spring 18, and when the force which actuates the balance piston 4 approximates the total value of the force which actuates the control piston 5 and the tension of the control spring 18, the balance piston 4 moves downward, and at the same time, the discharge valve 15 also moves downward. Therefore, the supply valve 13 comes down with the discharge valve seat 16 being contacted, and it comes into contact with the supply valve seat 11. As a result, the pressure stops rising in the output chamber 7 and in the balance chamber, and the force which actuates the balance piston 4 is balanced with the total value of the force which actuates the control piston 5 and the tension of the control spring 18. Thus, the pressure in the output chamber 7 which is supplied to the brake control system is proportional to the air spring pressure.

At this time, when the pressure of the air spring rises, the pressure in the control chamber 10 rises, and the control piston 5 pushes up the discharge valve 15 as well as the balance piston 15 by means of the control spring 18. Therefore, the supply valve 13 is moved away from the supply valve seat 11, and the supplied air enters the output chamber 7 and the pressure in the balance chamber 8 rises. As a result, the balance piston 4 is pushed down and the pressure becomes proportional by having the supply valve 13 sit on the supply valve seat 11. On the other hand, when the air spring pressure falls, the pressure in the control chamber 10 falls, and the balance piston 4 pushes down the control piston 5 through the control spring 18. Therefore, the discharge valve seat 16 of the discharge valve 15 moves away from the supply valve 13, and the pressurized air in the balance chamber 8 is discharged through the inner hole 17, the discharge chamber 9, and the discharge port 21 into the atmosphere. As a result, the pressure in the balance chamber 8 falls, and when it becomes proportional to the pressure in the control chamber 10, the balance piston 4 is pushed up by the control piston 5. The discharge valve seat 16 comes into a contact with the supply valve 13, and the pressurized air in the balance chamber 8 stops discharging to become proportional. Thus, pressurized air which is proportional to the pressure in the control chamber 10 is charged to the brake control system through the output pipe 20.

On the other hand, the air spring pressure fluctuates not only with the load on the rolling stock but also depending on the railroad conditions. Therefore, when a change in the air spring pressure is transmitted to the control chamber 10, the control piston 5 and the balance piston 4 move their positions responding to the pressure change, and the discharge valve 15 also moves up and down depending on the change. The supply valve seat 11 and the discharge valve seat 16 are opened and closed by the supply valve 13, the pressurized air in the output chamber 7 is supplied and discharged, and the output pressure fluctuates.

These position changes of the control piston 5 and the balance piston 4 hasten fatigue and abrasion on both pistons 4, 5, as well as on the discharge valve 15 and the supply valve 13. They also waste the pressurized air unnecessarily during the rolling stock operation.

As shown in FIG. 1, the throttle 24 and the brake air reservoir 23 are placed as buffers between the air spring and the control chamber 10 in order to reduce sudden pressure changes from the air spring, then pressure enters the control chamber 10. Therefore, sudden air spring pressure changes are not transmitted to the control chamber 10.

However, this type of buffer cannot absorb slow pressure changes, but changes the position of the control piston 5. When the rolling stock is running, this pressure change creates a constant position change of the balance piston 4. The discharge valve 15 keeps opening and closing the supply valve seat 11 and the discharge valve seat 16, and pressurized air is wasted every time it is supplied and discharged. The frequent position changes cause the wear and tear of both pistons 4, 5. Furthermore, this type of load responsive valve requires space and a complicated design for a brake air reservoir 23 and a throttle 24, and it also causes a weight problem. These are the shortcomings of the conventional load responsive valve.

SUMMARY OF THE INVENTION

It is an object of the present invention to design a load responsive valve which is not affected by the change in control pressure during the operation of the rolling stock. Such a load responsive valve must restrain the position of the control piston when the brake is released, and it must free the control piston position when the brake is applied.

In order to achieve these objectives, the load responsive valve is provided with a pilot chamber that is pressurized to overcome the effect of control pressure acting on the control piston during a brake release to nullify the effect of control pressure fluctuations, the pilot chamber pressure being discharged when the brake is applied. Therefore, when the brake is applied, a pressure medium proportional to a control pressure, such as the air spring pressure, is supplied to the brake control system; however, when the brake is released during the rolling stock operation, the control piston and the balance piston do not change their positions, even if the control pressure changes due to vibrations of the rolling stock. There is no supplying and discharging of the brake output pressure medium and accordingly there is less wear and tear on both pistons, and less consumption of the air. The effect is obvious because the operating time of the rolling stock is longer than the brake applying time. This arrangement also has the additional merit of having a simpler structure due to the elimination of the buffers, such as the throttle and the brake air reservoir. Control pressure such as air spring pressure can enter the control chamber directly, thus the space and the weight problems are also solved.

BRIEF DESCRIPTION OF THE DRAWINGS

The following explanation is an example of the new invention based on the drawings in which.

DESCRIPTION AND OPERATION

Figure 1:
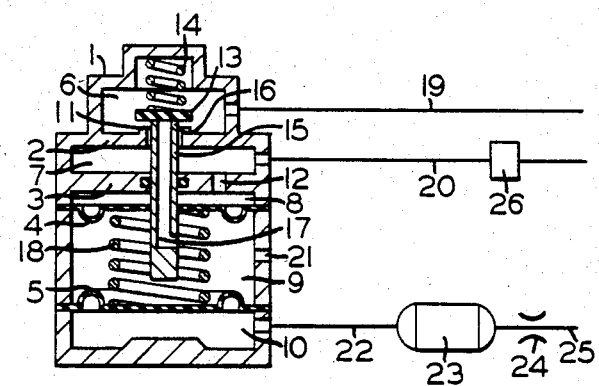
FIG. 1 is a diagrammatic showing a load responsive relay valve known in the prior art and fully explained hereinbefore.

The input chamber 6 is formed at the upper part of the main body 1. The supply valve 13 is situated above the supply valve seat 11 with the supply valve spring 14. The discharge valve 15 has a plate-type balance piston 4 installed in the wall between the first detached wall 3 and the second detached wall 27, and a plate-type pilot piston 29 installed in the wall below the second detached wall 27, around the discharge valve. The output chamber 7 is connected to the brake control system (not shown in the figure) through the output pipe 20. Between the balance piston 4 and the first detached wall 3, the balance chamber 8 is formed and connected to the output chamber 7 through the connecting hole 12. Between the balance piston 4 and the second detached wall 27, the atmospheric chamber 28 is formed to connect to the atmosphere through the ventilation hole 31. A pilot chamber 30 is formed between the second detached wall 27 and the pilot piston 29. The discharge chamber 9 is formed between the pilot piston 29 and the plate-type control piston 5 with a control spring 18 acting between these pistons. The pilot chamber 30 is connected to the pressurized air source (not shown in the figure) through the pilot pipe 32, the pilot valve 33, and the pilot pipe 34. The discharge chamber 9 is connected to the atmosphere through the discharge port 21. The control chamber 10 is connected to the air spring (not shown in the figure) through the control pipe 22. The pilot valve 33 consists of an electromagnetic section 35 and a switch section 36. The electromagnetic section 35 functions by receiving a brake command from the brake system of the rolling stock (not shown) and operates the switch section 36. The switch section 36 has a first switch postion 36a and a second switch position 36b. When the electromagnetic section receives a brake release command, the switch section is set in the second switch position 36b to connect the pilot pipes 32 and 34, and pressurized air is brought into the pilot chamber 30. When a brake command is received, the switch section is set in the first switch position 36a to close the pilot pipe 34 and make the pilot chamber 30 connect to the atmosphere through the pilot pipe 32.

Figure 2:
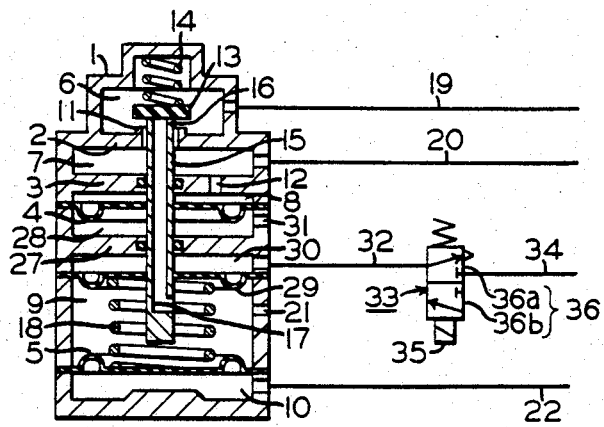
FIGS. 2 and 3 are diagrammatics showing different positions of the load responsive valve according to the present invention showing air spring pressure for the control pressure, and air for the pressure medium. It is already known how to obtain brake output pressure proportional to the air spring pressure, and this has already been explained with respect to FIG. 1. Thus, this overlapping explanation is omitted here, and the same numbering is used except for the new sections.
Figure 3:
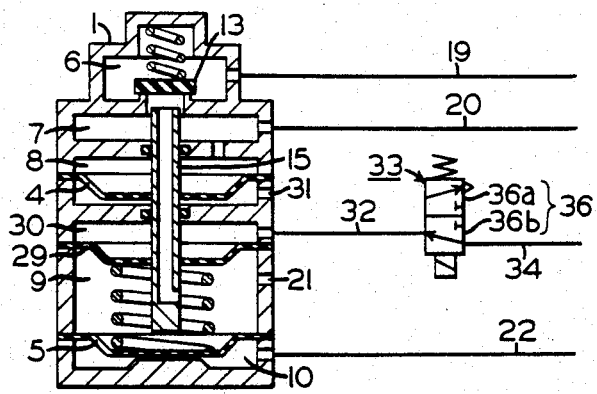

Thus, the load responsive valve by this invention functions when the brake is released and the rolling stock is running, and the pilot valve 33 is set in the second switch position 36b as shown in FIG. 3. The pressurized air is supplied to the pilot chamber 30 from the pressurized air source. Thus, the force which actuates the pilot piston 29 pushes down the pilot piston 29 against the force provided by the air spring pressure acting on the control piston 5. Therefore, the discharge valve 15 moves down with the balance piston 4, the supply valve seat 11 is closed, and the discharge valve seat 16 is open. As a result, pressurized air in the output chamber 7 is discharged into the atmosphere through the discharge port 21. The pressurized air from the pressurized air source, which enters the pilot chamber 30 always has higher pressure than the air spring pressure which enters the control chamber 10. Therefore, when the pilot valve 33 is operated to the second switch position 36b, the pilot piston 29 is down (see FIG. 3); the supply valve seat 11 is closed; the pressurized air in the input chamber is sealed in, the discharge valve seat 16 is opened; the output chamber 7 is connected to the atmosphere regardless of any change in the air spring pressure due to the vibrations of the rolling stock during operations. When the brake is applied, the electromagnetic section 35 receives a brake command and the pilot valve 33 is operated to set the switch 36 to the first switch postion 36a; the pilot pipe 34 is closed and the pilot chamber 30 is connected to the atmosphere by the switch 36 through the pilot pipe 32 (see FIG. 2). As a result, because the force which pushes down the pilot piston 29 is eliminated, the force which actuates the control piston 5 pushes up the discharge valve 15 as well as the pilot piston 29 and the balance piston 4 through the control spring 18. Therefore, the discharge valve seat 16 closes, the supply valve seat 11 opens, and pressurized air in the input chamber 6 flows into the brake control system and into the balance chamber 8 through the output chamber 7.

When the force which actuates the balance piston 4 becomes proportional to the force which actuates the control piston 5 through the control spring 18, the discharge valve seat 16 and the supply valve seat 11 are both closed, and the pressure in the control chamber 10, which is proportional to the air spring pressure, is supplied to the brake control system.

One control piston 5 was used in the example described above, but two control pistons can also be used in this load responsive valve. In this case, the pressurized air is brought in from two air springs in the rolling stock in order to obtain an average rolling stock load, and the output pressure must be proportional to it. The control spring 18 can be placed in the control chamber 10, or it can be removed because it is used to compensate for the air spring pressure when there is no rolling stock load.

Figure 4:
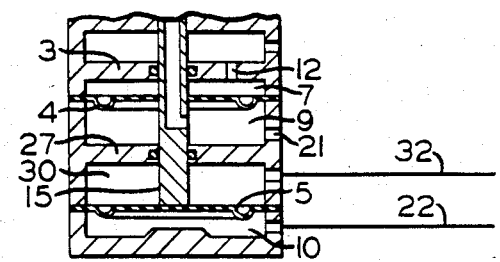
FIGS. 4 and 5 are alternate arrangements of the invention also shown diagrammatically.

Furthermore, as shown in FIG. 4, the pilot piston 29 can be taken out by placing the pilot chamber 30 on the other side of the control chamber 10 of the control piston 5.

Figure 5:
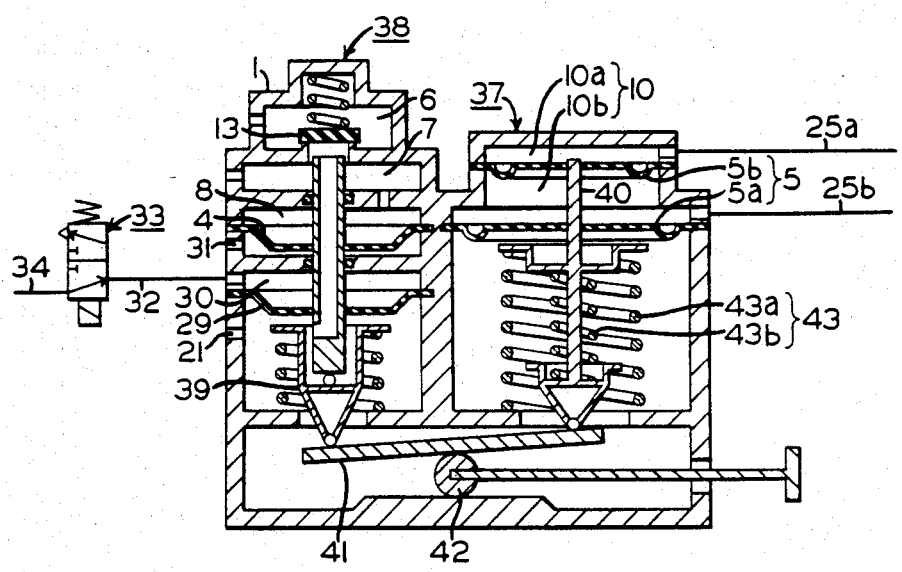

For the other example, the air spring pressure inlet section and the brake control pressure output are placed side by side as shown in FIG. 5.

In FIG. 5, the output section 38 of the brake control pressure is on the left side, and the inlet section 37 where the air spring pressure is received is on the right side. The control chambers 10a and 10b are connected to two air springs (or two places in the air spring) in the rolling stock (not shown in the figure) through the control pipes 25a and 25b, respectively. The ratio of the effective surface areas of the control pistons 5a and 5b is 2:1. Both control pistons are joined with a connecting rail 40. The lever 41 is placed on a variable fulcrum 42. It supports the output section 38 through the control spring 18 on the left side and the entering section 37 through the auxiliary springs 43a, 43b on the right side. The air spring pressures brought into the control chambers 10a, 10b are added through the different area control pistons. The resultant force of the control pistons 5a and 5b actuates the lever 41 and controls the pressure of the output chamber 7 in the output section 38 through the variable fulcrum 42. The selected ratio of lever 41 serves to divide the result of the added air spring pressure, so that the pressure of output chamber 7 is determined in accordance with an average of the effective air spring pressures. The pilot valve 33 functions similarly to that shown in FIG. 2, thus the explanation is omitted.

The pilot valve 33 was described as an electromagnetic switch valve in the example described above, but it can alternatively be an air-pilot-type switch valve.

Having now described the invention, what I claim as new and desire to secure by Letters Patent, is:

1. A proportional type load responsive control valve for a vehicle brake system comprising:
   (a) a housing having a supply inlet, at least one control inlet, a pilot inlet, a delivery outlet, and an exhaust outlet;
   (b) valve means having an application position for establishing fluid pressure communication between said supply inlet and said delivery outlet, and a release position for establishing fluid pressure communication between said delivery outlet and said exhaust outlet;
   (c) first piston means subject on one side to a load responsive control fluid pressure corresponding to the vehicle load condition at said at least one control inlet for urging movement of said valve means toward said application position;
   (d) second piston means subject to the fluid pressure effective at said delivery outlet for urging movement of said valve means toward said release position; and
   (e) said first piston means being further subject on the opposite side to a pilot pressure at said pilot inlet only when a release condition of vehicle braking exists for counteracting said control fluid pressure at said one side and thereby preventing said movement of said valve means toward said application position.

2. A load responsive control valve, as recited in claim 1, wherein said predetermined condition of vehicle braking is the release of vehicle brakes.

3. A load responsive control valve, as recited in claim 2, further comprising pilot valve means operative in response to said predetermined condition of vehicle braking for supplying said pilot pressure at said pilot inlet.

4. A load responsive control valve, as recited in claim 3, further characterized in that said pilot valve means is operative in the absence of said release condition of vehicle braking for exhausting said pilot pressure.

5. A load responsive control valve, as recited in claim 4, wherein said pilot valve means comprises:
   (a) an electromagnetic actuator energizable in said predetermined condition of vehicle braking to urge said pilot valve means to a first position in which said pilot pressure is connected to said pilot inlet; and
   a spring urging said pilot valve means to a second position in which said pilot pressure is exhausted.

6. A load responsive control valve, as recited in claim 1, wherein said control fluid pressure varies with the load of said vehicle.

7. A load responsive control valve, as recited in claim 1, wherein said first piston means comprises:
   (a) a control piston having said control fluid pressure acting on one side thereof;
   (b) a pilot piston having said pilot pressure acting on the side thereof opposite said one side, said pilot piston being connected directly with said valve means; and (c) spring means interposed between said control and pilot pistons for transmitting relative movement therebetween.

8. A load responsive control valve, as recited in claim 1, wherein said first piston means and said second piston means are fixed to said valve means without relative movement therebetween.

9. A load responsive control valve, as recited in claim 8, further comprising:
 (a) said first piston means including:
  (i) first and second interconnected piston abutments subject to said control fluid pressure;
  (ii) pilot piston subject to said pilot pressure, said pilot piston being fixed to said valve means; and
 (b) a force transmitting lever interconnecting said first and second piston abutments with said pilot piston.

10. A load responsive control valve, as recited in claim 9, further comprising:
 (a) said at least one control inlet being a pair of inlets via which different control fluid pressures are supplied to the respective ones of said first and second piston abutments, said interconnected first and second piston abutments having a 2:1 size ratio whereby said different control fluid pressures are added; and
 (b) an adjustable fulcrum member about which said lever is pivotable to vary the ratio of said lever, whereby the force of said control fluid pressures acting on said first and second piston abutments is reduced by said force transmitting lever to obtain an average of the added control pressures.

* * * * *

UNITED STATES PATENT AND TRADEMARK OFFICE
CERTIFICATE OF CORRECTION

PATENT NO. : 4,585,279
DATED : April 29, 1986
INVENTOR(S) : Shigeaki Doto

It is certified that error appears in the above-identified patent and that said Letters Patent are hereby corrected as shown below:

Column 6, Claim 5, line 56, before "a", first occurrence, insert --(b)--

Signed and Sealed this

Seventeenth Day of February, 1987

Attest:

DONALD J. QUIGG

Attesting Officer     Commissioner of Patents and Trademarks